United States Patent
Mo et al.

(10) Patent No.: US 7,567,208 B2
(45) Date of Patent: Jul. 28, 2009

(54) POSITION AND TIME DETERMINATION UNDER WEAK SIGNAL CONDITIONS

(75) Inventors: Jun Mo, San Jose, CA (US); Shaowei Han, Palo Alto, CA (US)

(73) Assignee: SiRF Technology Holdings, Inc., San Jose, CA (US)

( * ) Notice: Subject to any disclaimer, the term of this patent is extended or adjusted under 35 U.S.C. 154(b) by 0 days.

(21) Appl. No.: 11/771,845

(22) Filed: Jun. 29, 2007

(65) Prior Publication Data
US 2009/0002226 A1 Jan. 1, 2009

(51) Int. Cl.
*G01S 1/00* (2006.01)
(52) U.S. Cl. .............................. 342/357.12; 342/357.15
(58) Field of Classification Search ............ 342/357.05, 342/357.12, 357.15
See application file for complete search history.

(56) References Cited

U.S. PATENT DOCUMENTS

| | | | |
|---|---|---|---|
| 6,031,881 A * | 2/2000 | Weill et al. | 342/386 |
| 6,215,442 B1 | 4/2001 | Sheynblat et al. | |
| 6,323,803 B1 * | 11/2001 | Jolley et al. | 342/357.03 |
| 6,417,801 B1 | 7/2002 | van Diggelen | |
| 6,437,694 B1 | 8/2002 | Lee | |
| 6,670,916 B2 | 12/2003 | Edwards et al. | |
| 6,734,821 B2 | 5/2004 | van Diggelen | |
| 6,865,478 B2 | 3/2005 | Sirola et al. | |
| 2002/0163467 A1 * | 11/2002 | Martikka | 342/357.05 |
| 2003/0090413 A1 * | 5/2003 | Syrjarinne et al. | 342/357.05 |
| 2006/0066478 A1 * | 3/2006 | Maruyama et al. | 342/357.09 |
| 2006/0116820 A1 * | 6/2006 | Mori et al. | 342/357.05 |
| 2006/0290566 A1 * | 12/2006 | Syrjarinne et al. | 342/357.15 |

FOREIGN PATENT DOCUMENTS

JP 2002311122 A * 10/2002

OTHER PUBLICATIONS

P. Moore et al., GPS applications in power systems: Part 1 Introduction to GPS, Power Engineering Journal, vol. 13(1), abstract, Feb. 1999.*

* cited by examiner

*Primary Examiner*—Thomas H Tarcza
*Assistant Examiner*—Fred H Mull
(74) *Attorney, Agent, or Firm*—Pillsbury Winthrop Shaw Pittman LLP

(57) ABSTRACT

Described herein are systems and methods that are capable of determining receiver position and system time under weak signal conditions. When the receiver is unable to accurately determine the satellite signal travel time, e.g., due to weak signal reception or some other condition, the receiver can still estimate the pseudo-range for the satellite based on an initial receiver position and system time. In this case, the system and methods described herein provide the necessary initial receiver position and system time with enough accuracy to estimate the pseudo-range, even under weak signal conditions. The receiver can then use the estimated pseudo-range to determine a more accurate receiver position.

28 Claims, 2 Drawing Sheets

POSITION AND TIME DETERMINATION UNDER WEAK SIGNAL CONDITIONS

FIELD OF THE INVENTION

The present invention relates to position and time determination in a satellite based navigation receiver, e.g., GPS receiver, under weak signal conditions.

BACKGROUND OF THE INVENTION

The global positioning system (GPS) is a satellite-based radio-navigation system built and operated by the United States Department of Defense. The system uses twenty-four satellites orbiting the earth at an altitude of about 11,000 miles with a period of about twelve hours. Some additional satellites may be present as spares. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

Data is modulated to the GPS signal, in which each data bit spans 20 milliseconds. This data contains ephemeris that provides satellite orbit information and time information to help the receiver determine the system time. Under weak signal conditions, it is still possible for the receiver to acquire and track the GPS signal with a longer non-coherent integration time or other method. However, due to the low signal to noise ratio, the error rate of the decoded GPS broadcast data will be too high making it impossible to determine the signal transmit time. Under this condition, the traditional position calculation method can not be applied.

Some prior art references have been published that deal with the above conditions. The central concept of these methods is adding another variable as system time to compensate for the uncertainty of the signal transmit time. An additional observation measurement is required to help to solve the additional variable. As a result measurements of at least five satellites are needed to calculate the final position.

When the signal transmit time can not be determined, it is impossible to calculate the pseudo-range with the traditional method of multiplying the speed of light with the difference between the signal transmit time and receive time. Because only the C/A code is tracked, only a sub-millisecond fraction of the transmit time can be determined. As a result, the calculated pseudo-range will have 300 km ambiguity, which is the distance the signal travels in one millisecond.

Given an estimated pseudo-range of one satellite $\rho_i$, the pseudo-range can be divided into a millisecond part and a sub-millisecond part, $\rho_i = \rho_i^{(1)} + \rho_i^{(2)}$, where $$\rho_i^{(1)} = \Lambda \times \left\lfloor \frac{\rho_i}{\Lambda} \right\rfloor, \rho_i^{(2)} = \rho_i - \rho_i^{(1)}.$$

The symbol $\lfloor \ \rfloor$ indicates to take the integer value of the division. The symbol $\Lambda$ is the distance light travels in 1 ms and is about 300 km. Under weak signal conditions, only the sub-millisecond part $\rho_i^{(2)}$ can be obtained. The millisecond part $\rho_i^{(1)}$ can be estimated and used to calculate the pseudo-range $\rho_i$ by carrying out the following steps:

Make an estimation of the GPS time of signal arrival $T_u$.

Estimate the travel time of the signal $t_f$. If the travel time can not be estimated, use 70 ms as an approximation for $t_f$.

Calculate the satellite position at time $T_u - t_f$ as $\vec{s}_i(T_u - t_f)$, where $\vec{s}_i()$ is the satellite position as a function of time, which may be derived from ephemeris downloaded onto the receiver.

Use the estimated user position $\vec{u}$ to calculate the millisecond part of the pseudorange as:

$$\rho_i^{(1)} = \Lambda \times \left\lfloor \frac{\|\vec{s}_i(T_u - t_f) - \vec{u}\| + ct_u}{\Lambda} \right\rfloor,$$

where $t_u$ is the receiver clock offset.

Sum the parts $\rho_i^{(1)}$ and $\rho_i^{(2)}$ together to get $\rho_i = \rho_i^{(1)} + \rho_i^{(2)}$.

Although a precise determination of the receiver clock offset $t_u$ should include the same information as a precise determination of what is here called the GPS time at arrival $T_u$ (in the sense that if you know $t_u$ precisely, you should know $T_u$), the GPS time at arrival as used here likely does not convey the same information as the receiver clock offset. Thus, the GPS time at arrival is treated as independent of the receiver clock offset. By introducing the GPS time at arrival $T_u$ as one additional degree of freedom for the solution of the PVT equation, at least five satellites need to be tracked to solve the PVT. The equations are shown by the following:

At time $T_u - t_f$ the position of the $i^{th}$ satellite is $\vec{s}_i$, and the speed of the $i^{th}$ satellite is $\vec{v}_i$, where i is used for a satellite index.

The initial receiver position is $\hat{u}$ and initial clock offset is $\hat{t}_u$.

An initial range $\hat{\rho}_i$ can be written as $\hat{\rho}_i = \hat{r}_i + c\hat{t}_u$, where $r_i = \|\vec{s}_i - \hat{u}\|$. The unit vector of $\hat{r}_i$ is $$\vec{a}_i = \frac{\vec{s}_i - \hat{\vec{u}}}{\hat{r}_i} = a_{xi} \cdot \vec{x} + a_{yi} \cdot \vec{y} + a_{zi} \cdot \vec{z},$$

in which $\vec{x}$, $\vec{y}$ and $\vec{z}$ correspond to the x, y and z axis. The difference between the initial range $\hat{\rho}_i$ and the range $\rho_i$ to be solved is $\Delta\rho_i = \hat{\rho}_i - \rho_i = \hat{r}_i + c\hat{t}_u - \rho_i$. The solution using five satellites can be given by:

$$\Delta\vec{\rho} = \begin{bmatrix} \Delta\rho_1 \\ \Delta\rho_2 \\ \Delta\rho_3 \\ \Delta\rho_4 \\ \Delta\rho_5 \end{bmatrix}$$

$$H = \begin{bmatrix} a_{x1} & a_{y1} & a_{z1} & \vec{a}_1 \cdot \vec{v}_1 & 1 \\ a_{x2} & a_{y2} & a_{z2} & \vec{a}_2 \cdot \vec{v}_2 & 1 \\ a_{x3} & a_{y3} & a_{z3} & \vec{a}_3 \cdot \vec{v}_3 & 1 \\ a_{x4} & a_{y4} & a_{z4} & \vec{a}_4 \cdot \vec{v}_4 & 1 \\ a_{x5} & a_{y5} & a_{z5} & \vec{a}_5 \cdot \vec{v}_5 & 1 \end{bmatrix} \text{ and } \Delta\vec{x} = \begin{bmatrix} \Delta x_u \\ \Delta y_u \\ \Delta z_u \\ \Delta T_u \\ -ct_u \end{bmatrix}$$

which gives $\Delta\vec{\rho} = H\Delta\vec{x}$.

With more than five satellites, we can use least square method to get the solution.

Because of the ambiguity of Λ in the pseudo-range calculation, the estimated user position and time should not be too far away from the true value, otherwise, the millisecond part of $\rho_i^{(1)}$ will have and incorrect value and result in an incorrect receiver position calculation. This limitation gives a restriction on the initial position and initial time of $$\kappa \cdot (T_u - \hat{T}_u) + \|\vec{u} - \hat{\vec{u}}\| < \frac{\Lambda}{2}.$$

Here $T_u$ and $\vec{u}$ are the true signal arrive time and receiver position respectively, $\hat{T}_u$ and $\hat{\vec{u}}$ are estimated initial signal arrive time and receiver position respectively, and κ is the maximum possible pseudo-range change rate (about 710 m/s).

If the above condition can not be met, several methods can be applied to help remove the ambiguity of the pseudo-range. One of these methods is to introduce one or more additional observation measurements so the number of equations in $\Delta \vec{\rho} = H \Delta \vec{x}$ is more than the number of variables. When using the least square method to solve the equations, we can get a residual of the solution. A grid is applied to the possible area covering the possible initial position. With all the possible initial positions and signal arrival times, the residual will reach the global minimum with the correct combination. These combinations should cover the span of all possible estimated signal arrival times and the area around the surface of the earth that can see all the satellites. Because this algorithm searches all the possible solutions and finds the minimum one, the computation time is significant and performing a position fix on an embedded computing system in a limited time is not practical.

Several publications discuss the above methods. A method using five satellites to perform the position fix is disclosed in U.S. Pat. Nos. 6,215,442 B1, and 6,437,694 B1 discloses a method using Kalman filter. Methods using six or more satellites that find the minimum residual result as the final solution are described in U.S. Pat. Nos. 6,417,801 B1 and 6,734,821 B2. In U.S. Pat. No. 6,865,478 B2, a method is given to reduce the possible initial positions to reduce the computation time. U.S. Pat. No. 6,670,916 gives a height constraint condition so that four satellites can be used to compute the position.

When the initial position and time is unknown or is less accurate such that the condition of $$\kappa \cdot (T_u - \hat{T}_u) + \|\vec{u} - \hat{\vec{u}}\| < \frac{\Lambda}{2}$$

can not be met, none of above methods can be applied to calculate receiver position within a reasonable computation time especially for embedded electrical devices.

Accordingly, there is a need for determining an initial position and time that is accurate enough to be used as a starting point to calculate the receiver position, and that can be performed within a reasonable computation time. This would provide relatively accurate initial position and time to meet the requirement of $$\kappa \cdot (T_u - \hat{T}_u) + \|\vec{u} - \hat{\vec{u}}\| < \frac{\Lambda}{2}$$

to perform further position calculations.

SUMMARY

Described herein are systems and methods that are capable of determining receiver position and system time under weak signal conditions.

When the receiver is unable to accurately determine the satellite signal travel time, e.g., due to weak signal reception or some other condition, the receiver can still estimate the pseudo-range for the satellite based on an initial receiver position and system time. In this case, the system and methods described herein provide the necessary initial receiver position and system time with enough accuracy to estimate the pseudo-range, even under weak signal conditions. The receiver can then use the estimated pseudo-range to determine a more accurate receiver position. Preferably, the systems and methods described herein require low computational load, allowing the initial position and time to be computed in real time and/or on embedded systems.

The above and other advantages of embodiments of this invention will be apparent from the following more detailed description when taken in conjunction with the accompanying drawings.

DETAILED DESCRIPTION

Figure 1:
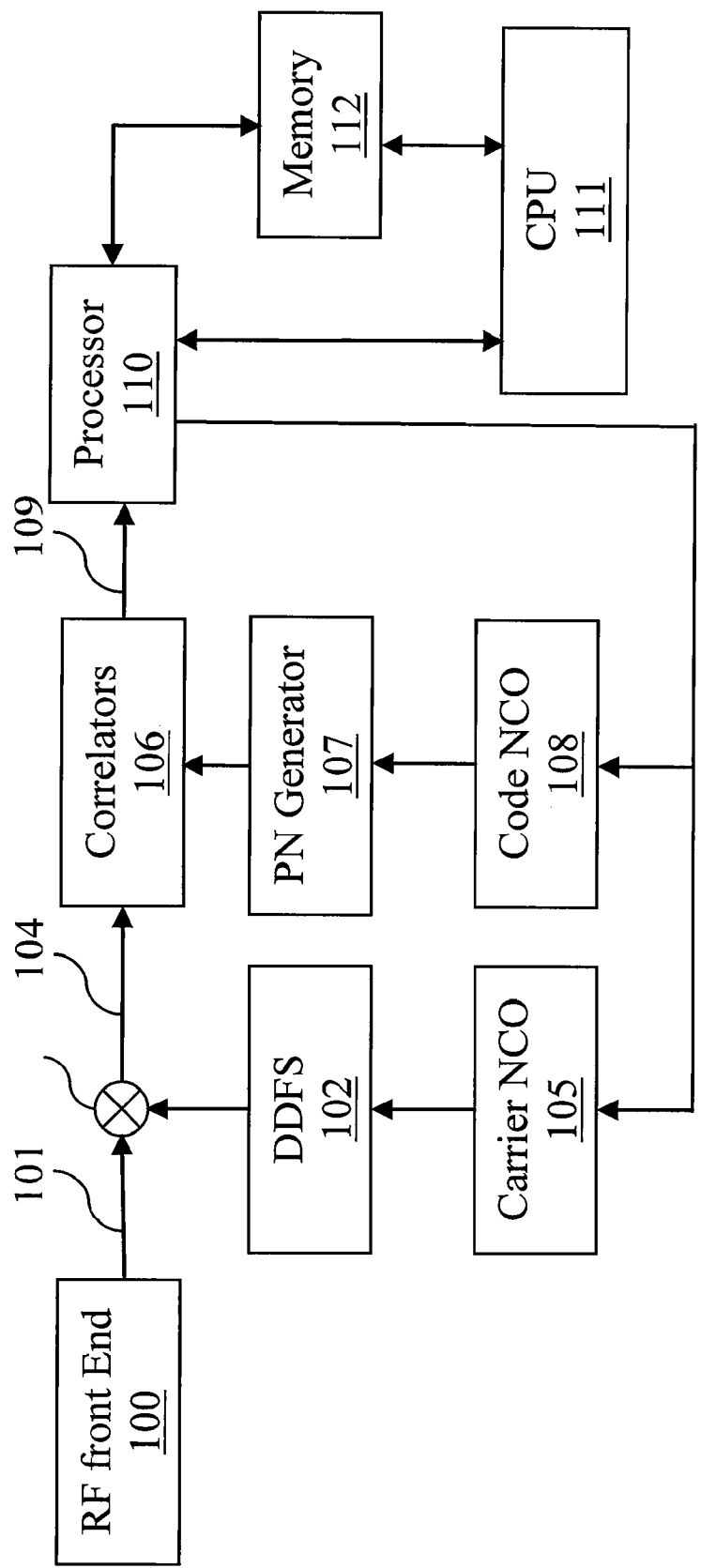
FIG. 1 is a block diagram illustrating an exemplary GPS receiver.

FIG. 1 illustrates a receiver according to an exemplary embodiment of the invention. An RF front-end 100 processes the RF signal received at the antenna (not shown). Operations of a conversional RF front-end 100 include amplification, down-conversion, and analog-to-digital conversion. The RF front end 100 outputs an intermediate frequency (IF) signal 101 to the baseband section of the receiver. The IF input is multiplied in IF mixer 103 in-phase and quad-phase with a local frequency signal generated by a direct digital frequency synthesizer (DDFS) 102. This mixing involves multiplying the IF input signal 101 by the local DDFS frequency which generates the in-phase and quad-phase component 104. The DDFS 102 is driven by a carrier numerically controlled oscillator (NCO) 105. In addition, carrier NCO 105 receives phase and frequency corrections from a processor 110. Because of this correction, the DDFS frequency and phase is almost the same as that of the IF input signal 101. Thus the I and Q signals produced by the IF mixers 103 are at near zero carrier frequency after being low-pass filtered to remove the high frequency components which are at twice the IF frequency band.

The I and Q components 104 are correlated in correlators 106 with a locally-generated PRN sequence generated by a PN generator 107. The PRN-sequence corresponds to the satellite whose signal is being processed by the baseband section at that time. The PN sequence generator is driven by code NCO 108. The local code frequency is made equal to the code rate of I and Q paths by corrective feedback from the processor 110 to the code NCO 108. In addition, the processor 110 controls the code NCO 108 to set the phase and frequency of local generated PN code. The correlator outputs are then sent to the processor 110 at every millisecond interval. The processor 110 is preferably a digital signal processor (DSP) or a general purpose CPU suitable for high speed arithmetic computations. Subsequent processing of the signals takes place in the processor 110, which then sends the feedback to carrier NCO 105 and code NCO 108. Also, the result of the processor is send to CPU 111, which can be the same one as the processor or a different processor running in parallel. The CPU 111 will derive pseudo-ranges and Doppler measurements using the information of the signal tracking result and then calculate the receiver position. Memory 112, which can include volatile and/or non-volatile memory, is used to store program and data. The ephemeris for the satellites are also stored in the memory 112 or obtained from other sources such as a GSM network.

According to the exemplary receiver illustrated in FIG. 1, when the GPS signal is acquired and tracked, the ranging code is synchronized with the local generated code, and the local oscillator tracks the signal carrier, which enables the receiver to measure the Doppler of the satellite. The Doppler measurement for an $i^{th}$ satellite can be expressed as:

$$f_{di} \cdot L = [\vec{v}_i(T_u - t_f) - \vec{v}_u] \cdot \frac{\vec{u} - \vec{s}_i(T_u - t_f)}{\|\vec{u} - \vec{s}_i(T_u - t_f)\|} - c\dot{t}_u \quad (1)$$

where $f_{di}$ is the Doppler frequency, L is the wavelength of the L1 signal, $\vec{s}_i$ and $\vec{v}_i$ are the position and speed of the $i^{th}$ satellite at time $T_u$-$t_f$ respectively, and $\vec{u}$ and $\vec{v}_u$ are receiver position and speed respectively. The quantity $f_{di} \cdot L$ expresses the Doppler in terms of a rate change of the distance between the satellite and receiver with time. The quantity —c $\dot{t}_u$ takes into account receiver clock drift. In many cases, the receiver is not moving at a very high speed. Thus, some approximations can be applied such as ignoring the speed of the receiver, i.e., assuming $\vec{v}_u$ is zero. This approximation is suitable if the purpose of this method is not to provide very accurate receiver position, but receiver position that is accurate enough to be used as an initial position or starting point in calculations for estimating the pseudo-range. The time of signal travel can also be ignored because the uncertainty of $T_u$ is much more than $t_f$. With these approximation, equation (1) can be simplified to the following:

$$V_i = f_{di} \cdot L = \vec{s}(T_u) \cdot \frac{\vec{u} - \vec{s}_i(T_u)}{\|\vec{u} - \vec{s}_i(T_u)\|} - c\dot{t}_u \quad (2)$$

Here $\vec{s}(T_u)$ is the derivative of position $\vec{s}_i(T_u)$ and is used as the speed of the satellite at time $T_u$. The derivate of the satellite position can be calculated using a differential value (compute satellite position at different times and divide by the time difference) or a first derivative equation of the equation used to calculate position.

The receiver position $\vec{u}$ comprises three dimension coordinate components x, y and z. Including two additional variables, receiver time as $T_u$ and receiver local oscillator frequency bias as $\dot{t}_u$, equation (2) can be linearized as $$V_i(\hat{x} + \Delta x, \hat{y} + \Delta y, \hat{z} + \Delta z, \hat{T}_u + \Delta T_u, \hat{\dot{t}}_u + \Delta \dot{t}_u) = \quad (3)$$

$$V_i(\hat{x}, \hat{y}, \hat{z}, \hat{T}_u, \hat{\dot{t}}_u) + \frac{\partial V_i(\hat{x}, \hat{y}, \hat{z}, \hat{T}_u, \hat{\dot{t}}_u)}{\partial \hat{x}} \Delta x +$$

$$\frac{\partial V_i(\hat{x}, \hat{y}, \hat{z}, \hat{T}_u, \hat{\dot{t}}_u)}{\partial \hat{y}} \Delta y + \frac{\partial V_i(\hat{x}, \hat{y}, \hat{z}, \hat{T}_u, \hat{\dot{t}}_u)}{\partial \hat{z}} \Delta z +$$

$$\frac{\partial V_i(\hat{x}, \hat{y}, \hat{z}, \hat{T}_u, \hat{\dot{t}}_u)}{\partial \hat{T}_u} \Delta T_u + \frac{\partial V_i(\hat{x}, \hat{y}, \hat{z}, \hat{T}_u, \hat{\dot{t}}_u)}{\partial \hat{\dot{t}}_u} \Delta \dot{t}_u$$

where $\hat{x}, \hat{y}, \hat{z}, \hat{T}_u$ and $\hat{\dot{t}}_u$ are initial values of variables x, y, z, $T_u$, and $\dot{t}_u$ respectively. The symbol $\Delta$ for a variable indicates the difference between the initial value and the value to be solved. The above linearization is determined by taking a Taylor series expansion of $V_i$ and keeping the first order partial derivative of the expansion.

Some intermediate variables and equations are listed below to simplify the final result.

The equations $\hat{r}_{xi}=\hat{x}-x_{si}(\hat{T}_u), \hat{r}_{yi}=(\hat{y}-y_{si}(\hat{T}_u)), \hat{r}_{zi}=(\hat{z}-z_{si}(\hat{T}_u))$ represent the difference of the receiver and the $i^{th}$ satellite coordinates in three dimensions based on the initial values.

The equation $\hat{r}_i = \|\hat{u} - \vec{s}_i(\hat{T}_u)\| = \sqrt{\hat{r}_{xi}^2 + \hat{r}_{yi}^2 + \hat{r}_{zi}^2}$ is the geometry distance from the receiver to the $i^{th}$ satellite based on the initial values.

The equation $$\hat{v}_i = \frac{\hat{r}_{xi} \cdot \dot{x}_{si}(\hat{T}_u) + \hat{r}_{yi} \cdot \dot{y}_{si}(\hat{T}_u) + \hat{r}_{zi} \cdot \dot{z}_{si}(\hat{T}_u)}{\hat{r}_i}$$

is radial speed or range change rate of the $i^{th}$ satellite based on the initial values.

The equation $\Delta V_i = f_{di} \cdot L - V_i(\hat{x}, \hat{y}, \hat{z}, \hat{T}_u, \hat{\dot{t}}_u)$ is the difference of the measured Doppler and the calculated Doppler based on the initial values.

Based on the above equations, the partial derivatives in equation (3) can be given by:

$$\frac{\partial V_i(\hat{x}, \hat{y}, \hat{z}, \hat{T}_u, \hat{\dot{t}}_u)}{\partial \hat{x}} = \frac{\hat{f}_{xi}}{\hat{r}_i} = \frac{\dot{x}_{si}(\hat{T}_u) - \hat{v}_i \cdot \hat{r}_{xi}/\hat{r}_i}{\hat{r}_i} \quad (4)$$

$$\frac{\partial V_i(\hat{x}, \hat{y}, \hat{z}, \hat{T}_u, \hat{\dot{t}}_u)}{\partial \hat{y}} = \frac{\hat{f}_{yi}}{\hat{r}_i} = \frac{\dot{y}_{si}(\hat{T}_u) - \hat{v}_i \cdot \hat{r}_{yi}/\hat{r}_i}{\hat{r}_i} \quad (5)$$

$$\frac{\partial V_i(\hat{x}, \hat{y}, \hat{z}, \hat{T}_u, \hat{\dot{t}}_u)}{\partial \hat{x}} = \frac{\hat{f}_{zi}}{\hat{r}_i} = \frac{\dot{z}_{si}(\hat{T}_u) - \hat{v}_i \cdot \hat{r}_{zi}/\hat{r}_i}{\hat{r}_i} \quad (6)$$

$$\frac{\partial V_i(\hat{x}, \hat{y}, \hat{z}, \hat{T}_u, \hat{\dot{t}}_u)}{\partial \hat{T}_u} = \frac{\hat{g}_i}{\hat{r}_i} \quad (7)$$

$$\hat{g}_i = \hat{r}_{xi} \cdot \ddot{x}_{si}(\hat{T}_u) + \hat{r}_{yi} \cdot \ddot{y}_{si}(\hat{T}_u) +$$
$$\hat{r}_{zi} \cdot \ddot{z}_{si}(\hat{T}_u) - \dot{x}_{si}^2(\hat{T}_u) - \dot{y}_{si}^2(\hat{T}_u) - \dot{z}_{si}^2(\hat{T}_u) + \hat{v}_i^2$$

$$\frac{\partial V_i(\hat{x}, \hat{y}, \hat{z}, \hat{T}_u, \hat{\dot{t}}_u)}{\partial \hat{\dot{t}}_u} = -c \quad (8)$$

For five satellites, we can calculate the following matrixes:

$$V = \begin{bmatrix} \Delta V_1 \cdot \hat{r}_1 \\ \Delta V_2 \cdot \hat{r}_2 \\ \Delta V_3 \cdot \hat{r}_3 \\ \Delta V_4 \cdot \hat{r}_4 \\ \Delta V_5 \cdot \hat{r}_5 \end{bmatrix},$$

$$H = \begin{bmatrix} \hat{f}_{x1} & \hat{f}_{y1} & \hat{f}_{z1} & \hat{g}_1 & \hat{r}_1 \\ \hat{f}_{x2} & \hat{f}_{y2} & \hat{f}_{z2} & \hat{g}_2 & \hat{r}_2 \\ \hat{f}_{x3} & \hat{f}_{y3} & \hat{f}_{z3} & \hat{g}_3 & \hat{r}_3 \\ \hat{f}_{x4} & \hat{f}_{y4} & \hat{f}_{z4} & \hat{g}_4 & \hat{r}_4 \\ \hat{f}_{x5} & \hat{f}_{y5} & \hat{f}_{z5} & \hat{g}_5 & \hat{r}_5 \end{bmatrix},$$

$$\Delta x = \begin{bmatrix} \Delta x \\ \Delta y \\ \Delta z \\ \Delta \dot{T}_u \\ -c\Delta \dot{t}_u \end{bmatrix}$$

These matrixes can be used in the following equation to solve for the receiver position and system time:

$$V = H \cdot \Delta x \quad (9)$$

The above calculation can be repeated over several iterations until the result converges. In this case, the calculated results x, y, z, $T_u$ and $t_u$ of one iteration of the calculation are used as the initial values in the next iteration of the calculation and so on. The calculation is repeated until the calculated results are close enough to their corresponding initial values, e.g., such that the results are accurate enough to be used as starting points for estimating the pseudo-range. The final calculated position and time for each satellite may then be used as the initial position and time (starting points) for estimating the pseudo-range for the satellite, e.g., using the methods described in the background.

For the case that there are more than five satellites, we use can use the least square equation $\Delta x = (H^T H)^{-1} H^T V$.

Initial values for $\hat{x}$, $\hat{y}$, $\hat{z}$, $\hat{T}_u$ and $\hat{t}_u$ can be based on approximations and the convergence range can be very wide. A reasonable guess of the system time for the first iteration is to use the time-of-ephemeris (toe) of ephemeris stored in memory or the real time clock (RTC) time of the device. The initial receiver position for the first iteration can be a previous known receiver position, e.g., a previously computed position stored in memory. If this position is not available, another method is to calculate the geometrical center of the acquired satellites at the selected time, and use the projection point of this geometrical center on the earth surface as the position. The value of $\hat{t}_u$ for the first iteration can be zero.

The above computations may be performed in firmware on the CPU 111 and/or processor 110, or dedicated hardware.

Figure 2:
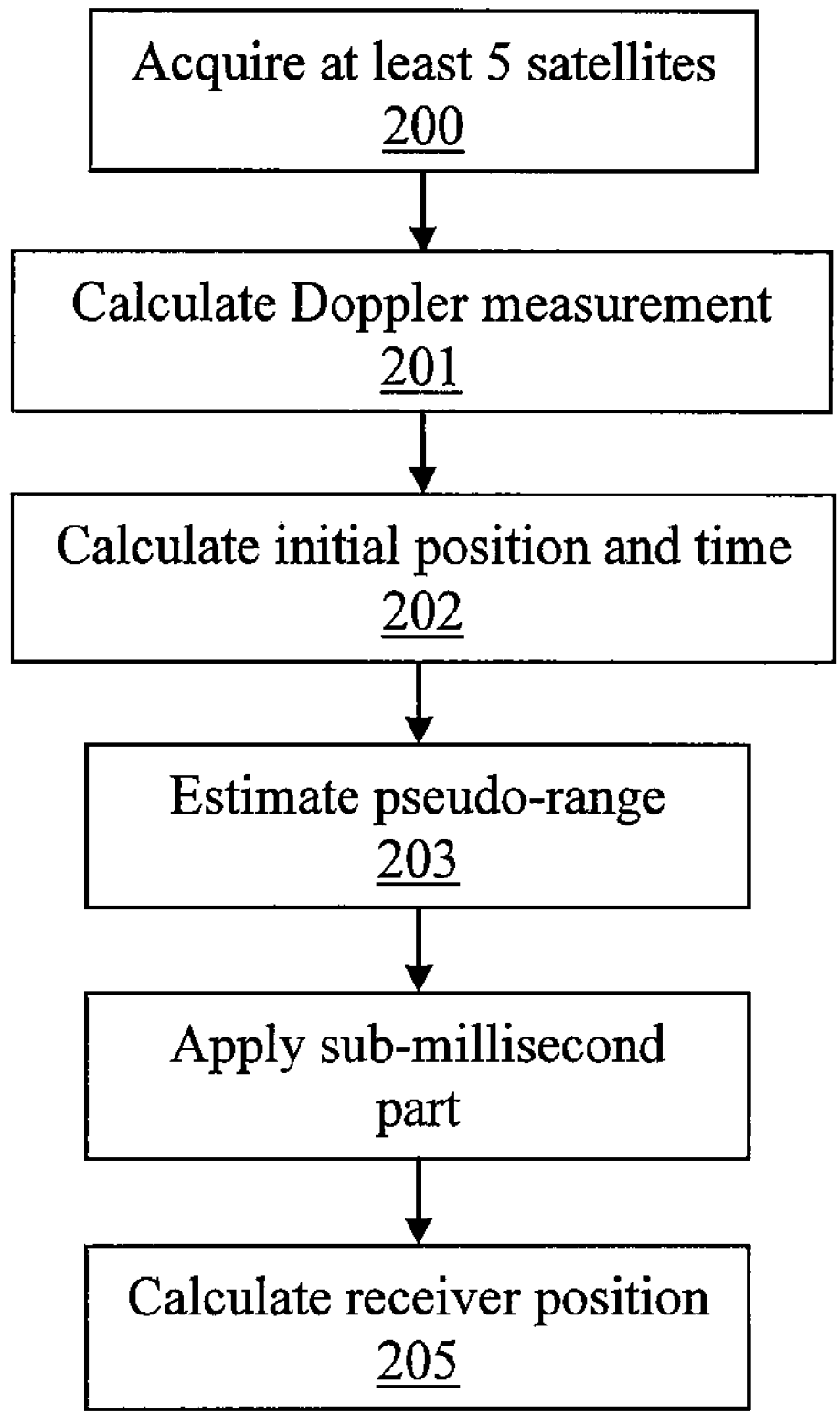
FIG. 2 is a flow diagram illustrating a method for determining receiver position under weak signal conditions.

FIG. 2 shows the overall steps for calculating the final receiver position according to exemplary embodiment, In the first step 200, at least five satellites are acquired. In step 201, Doppler measurement of each acquired satellite is taken. In step 202, receiver position and time are computed using the methods described above. In step 203, the computed receiver position and time for each satellite are used as starting points to estimate the pseudo-range for the satellite. In step 204, the sub-millisecond part is applied to the estimated pseudo-range to determine the final pseudo-range for the satellite. The sub-millisecond part of the pseudo-range can be derived from the local code sequence and code phase. Finally, in step 205, the receiver position is calculated based on the final pseudo-ranges of the satellites, which may be displayed to the user and/or stored in memory.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

What is claimed is:

1. A method of determining position and time in a navigation receiver, comprising:
   receiving and tracking a signal from a satellite at the receiver;
   making a Doppler measurement for the satellite signal; and
   computing the position and time based on the Doppler measurement,
   wherein the computation of the position and time is performed over several iterations,
   and wherein each iteration of the computation comprises solving a set of equations with coefficients derived from partial derivatives of a Doppler equation.

2. The method of claim 1, further comprising using the computed position and time to estimate a pseudo-range for the satellite.

3. The method of claim 1, wherein the receiver is unable to obtain accurate time information for the satellite signal before the time is computed.

4. The method of claim 1, further comprising receiving and tracking signals from at least five satellites.

5. The method of claim 4, further comprising:
   making a Doppler measurement for each of the at least five satellites signals; and
   computing the position and time based on the Doppler measurements for the at least five satellites.

6. The method of claim 1, wherein the Doppler measurement is derived from a local oscillator frequency of the receiver.

7. The method of claim 1, wherein the position and time computation uses five independent variables.

8. The method of claim 1, wherein initial values of the position and time are used in the first iteration of the computation.

9. The method of claim 8, wherein the initial value of the position comprises a previous position stored in memory on the receiver.

10. The method of claim 8, wherein the initial value of the time is based on a real time clock (RTC) or a time-of-ephemeris of ephemeris.

11. The method of claim 10, wherein the RTC comprises an external clock.

12. The method of claim 10, wherein the ephemeris is retrieved from memory on the receiver or from an external source.

13. The method of claim 8, further comprising:
computing a geometric center of acquired satellites;
using a projection point of the geometric center on the surface of the earth as the initial value of the position.

14. The method of claim 1, wherein the receiver comprises a GPS receiver, a GLONASS receiver, a Galileo receiver, or other GNSS satellite based navigation receiver.

15. A navigation receiver, comprising:
a radio frequency front-end for receiving satellite signals;
a baseband section for processing the received satellite signals; and
a processor coupled to the baseband section, wherein the processor is configured to make
a Doppler measurement for at least one of the satellite signals, and compute a position and time based on the Doppler measurement,
wherein the processor performs the computation of the position and time over several iterations,
and wherein each iteration of the computation comprises solving a set of equations with coefficients derived from partial derivatives of a Doppler equation.

16. The receiver of claim 15, wherein the processor is configured to use the computed position and time to estimate a pseudo-range for the satellite.

17. The receiver of claim 15, wherein the receiver is unable to obtain accurate time information for the satellite signal before the time is computed.

18. The receiver of claim 15, wherein the processor is configured to receive and track signals from at least five satellites.

19. The receiver of claim 18, wherein the processor is configured to make a Doppler measurement for each of the at least five satellites signals, and compute the position and time based on the Doppler measurements for the at least five satellites.

20. The receiver of claim 19, wherein the processors derives the Doppler measurement from a local oscillator frequency of the receiver.

21. The receiver of claim 15, wherein the position and time computation uses five independent variables.

22. The receiver of claim 15, wherein the processor uses initial values of the position and time in the first iteration of the computation.

23. The receiver of claim 22, wherein the initial value of the position comprises a previous position stored in memory on the receiver.

24. The receiver of claim 22, wherein the initial value of the time is based on a real time clock (RTC) or a time-of-ephemeris of ephemeris.

25. The receiver of claim 24, wherein the RTC comprises an external clock.

26. The receiver of claim 24, wherein the ephemeris is retrieved from memory on the receiver or from an external source.

27. The receiver of claim 22, wherein the processor computes a geometric center of acquired satellites, and uses a projection point of the geometric center on the surface of the earth as the initial value of the position.

28. The receiver of claim 15, wherein the receiver comprises a GPS receiver, a GLONASS receiver, a Galileo receiver, or other GNSS satellite based navigation receiver.

* * * * *